(12) United States Patent
Terwilliger et al.

(10) Patent No.: US 8,977,655 B2
(45) Date of Patent: Mar. 10, 2015

(54) AUTOMATING EVOLUTION OF SCHEMAS AND MAPPINGS

(71) Applicant: Microsoft Corporation, Redmond, WA (US)

(72) Inventors: James F. Terwilliger, Redmond, WA (US); Philip A. Bernstein, Bellevue, WA (US); Aditya Unnithan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 87 days.

(21) Appl. No.: 13/909,058

(22) Filed: Jun. 3, 2013

(65) Prior Publication Data

US 2013/0275474 A1    Oct. 17, 2013

Related U.S. Application Data

(62) Division of application No. 12/815,417, filed on Jun. 15, 2010, now Pat. No. 8,458,226.

(51) Int. Cl.
*G06F 17/30* (2006.01)

(52) U.S. Cl.
CPC .............................. *G06F 17/30297* (2013.01)

USPC .......................................................... 707/803

(58) Field of Classification Search
USPC .......................................................... 707/803
See application file for complete search history.

(56) References Cited

PUBLICATIONS

Article entitled "Graphical User Interfaces as Updateable Views", by Terwilliger, dated 2009.*

* cited by examiner

*Primary Examiner* — Mahesh Dwivedi
(74) *Attorney, Agent, or Firm* — Nicholas Chen; Kate Drakos; Micky Minhas

(57) ABSTRACT

Aspects of the subject matter described herein relate to automating evolution of schemas and mappings. In aspects, mappings between a conceptual model and a store model are updated automatically in response to a change that occurs to the conceptual model. For example, when a change occurs to the conceptual model, a local scope of the change is determined. The local scope indicates mappings that are most similar to the type(s) affected by the change. Based on the local scope, a pattern of mappings between the conceptual model and the store model is determined. Using this pattern and the nature of the change, the mappings are updated according to the pattern. In addition, the store model and data thereon may be updated in a manner to preserve existing data that is not to be deleted in response to the change.

16 Claims, 8 Drawing Sheets

AUTOMATING EVOLUTION OF SCHEMAS AND MAPPINGS

BACKGROUND

Object-relational mapping tools (ORMs) have become a fixture in application programming over relational databases. They provide an application developer the ability to develop against a conceptual model which is generally an entity-relationship model with inheritance. The conceptual model is coupled to a mapping that describes the relationship between the model and a physical database schema. The ORM uses this mapping to translate queries and updates against the model into semantically-equivalent ones of the relational database.

When an application changes, however, the conceptual model for the application may need to change as well. To reflect these changes, an application developer may modify the physical database schema and create a new mapping between the conceptual model and the physical database schema. This process may be difficult and cumbersome.

SUMMARY

Briefly, aspects of the subject matter described herein relate to automating evolution of schemas and mappings. In aspects, mappings between a conceptual model and a store model are updated automatically in response to a change that occurs to the conceptual model. For example, when a change occurs to the conceptual model, a local scope of the change is determined. The local scope indicates mappings that are most similar to the type(s) affected by the change. Based on the local scope, a pattern of mappings between the conceptual model and the store model is determined. Using this pattern and the nature of the change, the mappings are updated according to the pattern. In addition, the store model and data thereon may be updated in a manner to preserve existing data that is not to be deleted in response to the change.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
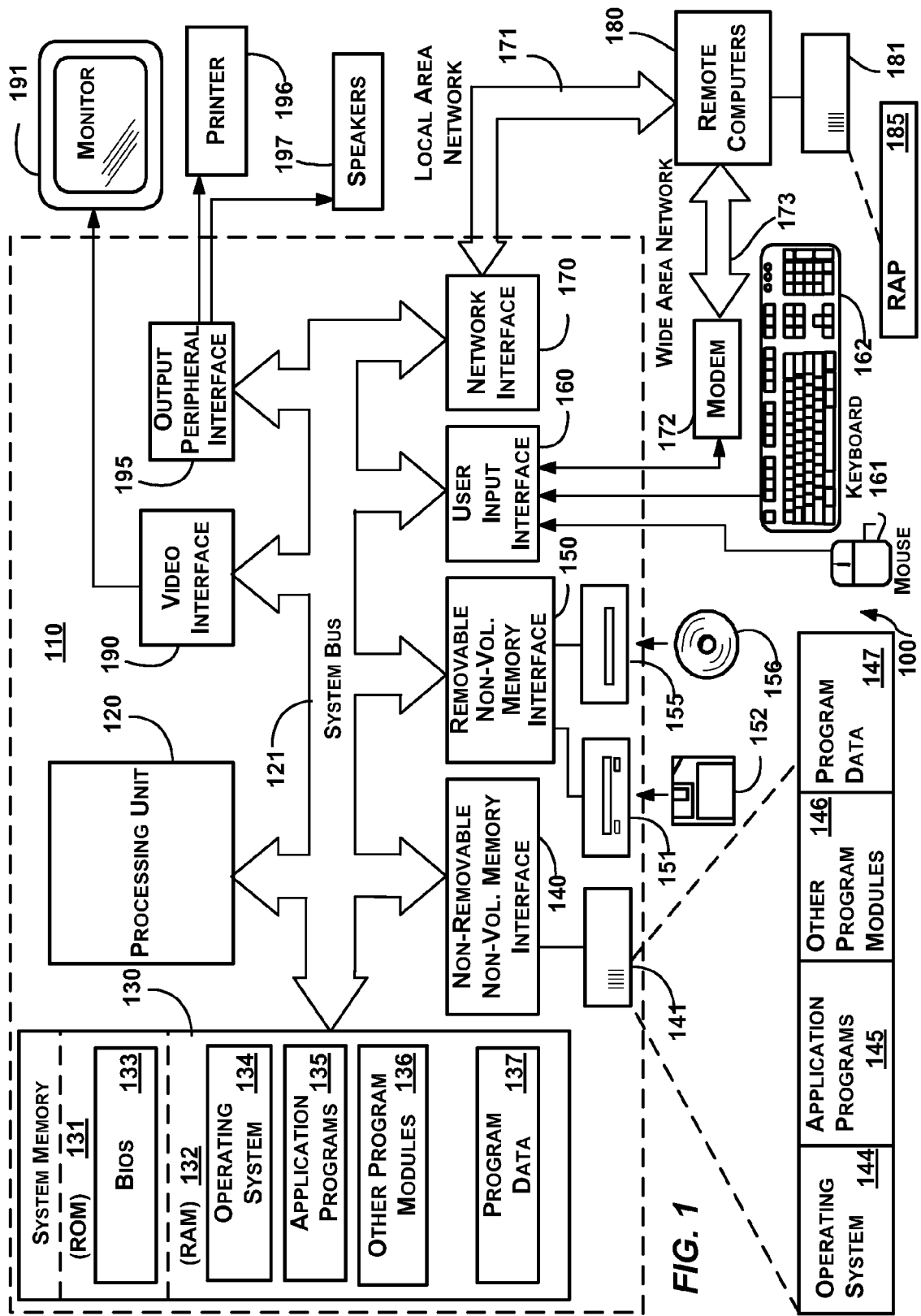
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, solid state devices, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs (RAPs) 185 as residing on memory device 181. It will be appreciated that the network connections shown are exemplary and other means of establishing a communications link between the computers may be used.

Automated Evolution

Figure 2:
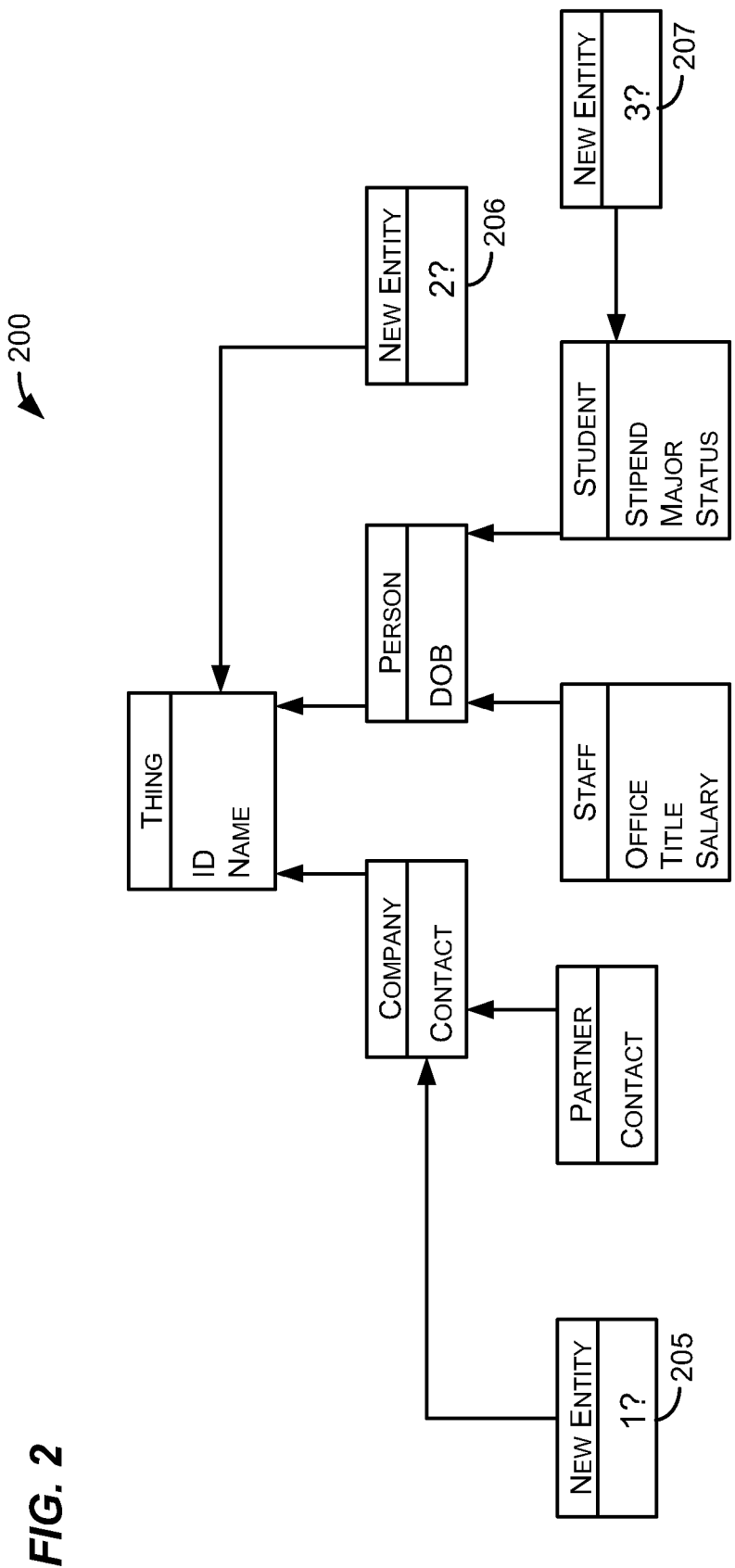
FIG. 2 is a block diagram that illustrates an exemplary conceptual model of an application in accordance with aspects of the subject matter described herein.

As mentioned previously, manually creating a new mapping between a conceptual model and a physical database schema may be difficult and cumbersome. FIG. 2 is a block diagram that illustrates an exemplary conceptual model of an application in accordance with aspects of the subject matter described herein. A new version of the application may need new types to be added to the type hierarchy, including the three types 205-207. With ORM tools, these conceptual model artifacts may be mapped to elements in persistent storage. An evolution component may determine the changes to make to mappings to the physical database schema.

If the entire hierarchy 200 in FIG. 2 is mapped to storage using a consistent pattern (e.g., by mapping the entire hierarchy to a single table, by mapping each type to its own table, or the like), the evolution component may discover the pattern and map the new types using the discovered pattern, regardless of where in hierarchy 200 the type is added. For more complex mappings, especially ones that do not employ a uniform mapping pattern, discovering the pattern may be more complicated. The choice of mapping and physical storage may differ for each of the three possible locations of the three types 205-207.

An evolution component may use an existing mapping to guide future incremental changes, even when the mapping scheme is not uniform across a hierarchy. If there is a consistent pattern in the immediate vicinity of the change, then that pattern is preserved after the change. In one case, if an entire hierarchy is mapped using a single scheme, then the evolution component may use the scheme for mapping new artifacts. Given a list of incremental conceptual model changes and the previous version of the model and mapping, the evolution component may:

1. Create a representation of the mapping (herein sometimes referred to as a mapping relation) that lends itself to analysis;
 2. For each model change, effect changes to the mapping, to the store model, and to any physical databases that conform to the store model; and
 3. Translate the mapping relation changes into changes to the original mapping.

Figure 3:
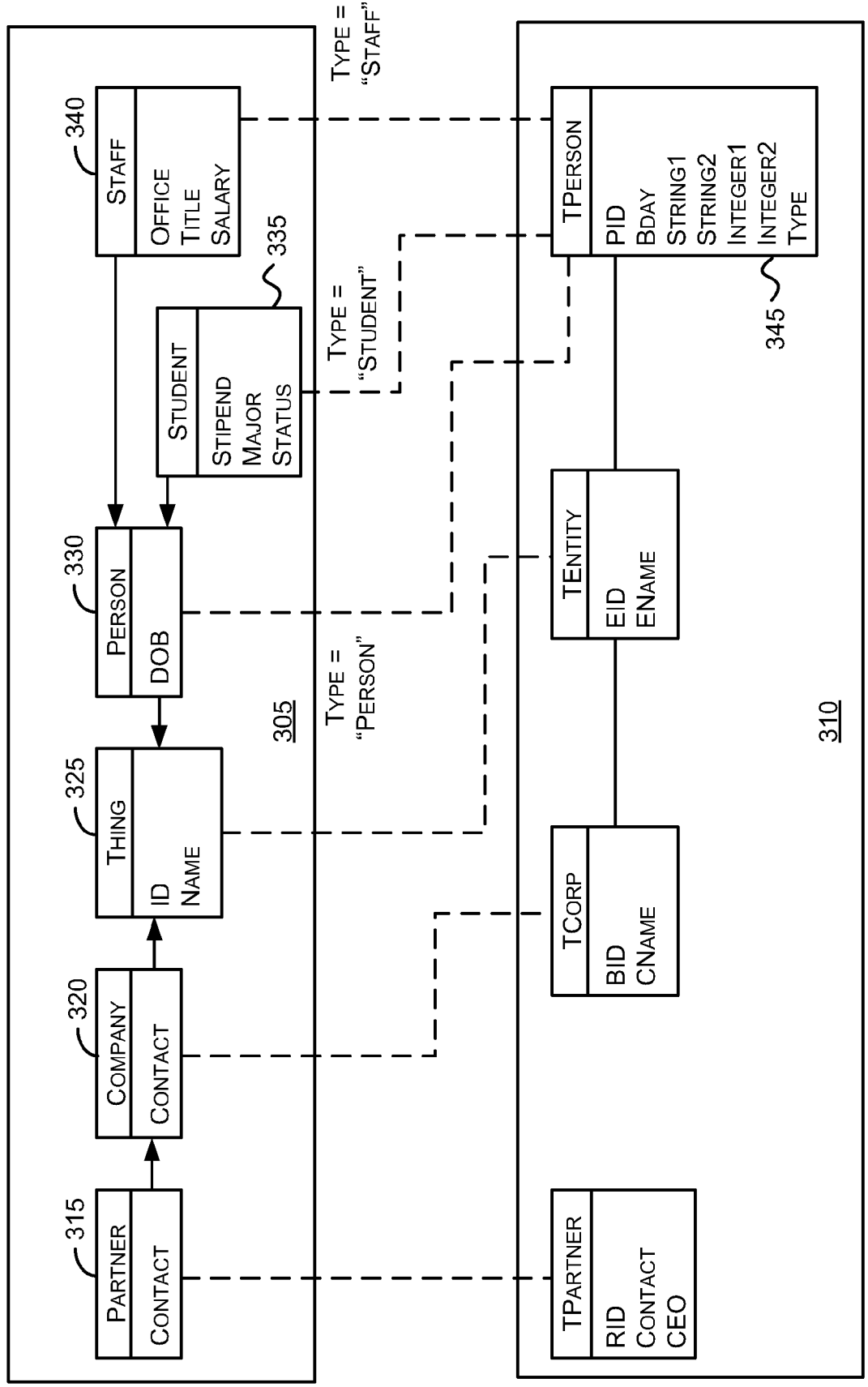
FIG. 3 is a block diagram that illustrates an exemplary mapping from a conceptual model to a database schema in accordance with aspects of the subject matter described herein.

FIG. 3 is a block diagram that illustrates an exemplary mapping from a conceptual model to a database schema in accordance with aspects of the subject matter described herein. The conceptual model 305 corresponds to the model illustrated in FIG. 2. The physical database schema 310 includes entities to which the conceptual model 305 has been mapped. The mapping between the conceptual model 305 and the physical database schema 310 has the following characteristics:

1. The types Thing 325, Company 320, and Person 330 are mapped using the Table-per-Type (TPT) scheme, where each type maps to its own table and hierarchical relationships are modeled using foreign keys;
 2. The type Partner 315 is mapped using the Table-per-Concrete Class (TPC) scheme relative to type Company 320, where each type still maps to its own table, but the child type Partner 315 maps all of its properties derived from Company 320; and
 3. The types Person 330, Student 335, and Staff 340 are mapped using the Table-per-Hierarchy (TPH) scheme, with the entire sub-hierarchy mapped to a single table. Furthermore, the types employ a mapping that reuses storage columns according to their domain, reducing the number of columns needed in table TPerson 345.

For this mapping, there is no single consistent mapping scheme for the entire hierarchy. However, an evolution component responsible for evolving the mapping based on the changes indicated in FIG. 2 may make some observations, specifically regarding the types that are "nearby":

1. The type 205 has sibling Partner and parent Company, mapped TPC;
 2. The type 206 has siblings Company and Person and parent Thing, mapped TPT;
 3. The type 207 has parent Student in a sub-hierarchy of types mapped TPH.

Using this informal reasoning, the evolution component may determine that types 205-207 are to be mapped using TPC, TPT, and TPH, respectively. A definition of "nearby" and an algorithm the evolution component may use to determine mappings are described in more detail below.

Different object-relational mapping tools have different methods of expressing mappings. Sometimes herein, the mappings are specified using an Entity Framework (EF) that has no first-class notion of mapping schemes like TPT, TPC, or TPH. In EF, a mapping is a collection of mapping fragments, each of which is an equation between select-project queries. Each fragment takes the form $\pi_{\vec{P}}\sigma_\theta E = \pi_{\vec{C}}\sigma_{\theta'} T$, where $\pi$ is the projection operator in relational algebra, $\sigma$ is the selection operator in relational algebra, $\vec{P}$ is a set of properties of client-side entity set E that are being projected, $\vec{C}$ is a set of columns of table T that are being projected, and $\theta$ and $\theta'$ are selection conditions over E and T respectively. When the operators $\pi$ and $\sigma$ are applied to an entity set E, their effect is as if they were applied to a table whose columns are the properties of E and whose rows are the entity instances of E. Conditions $\theta$ and $\theta'$ may be of the form c=v for column or property c and value v, c IS NULL, c IS NOT NULL, type tests IS T or IS ONLY T for type T, or conjunctions of such conditions. The teachings herein may also be adapted to apply when disjunction of conditions is allowed.

Mapping evolution may use a representation of an O-R mapping (sometimes called herein a mapping relation), a relation $\mathcal{M}$ with the following eight attributes:

$\mathcal{CE}$, $\mathcal{CP}$, $\mathcal{CX}$: Client entity type, property, conditions
$\mathcal{ST}$, $\mathcal{SC}$, $\mathcal{SX}$: Store table, column, conditions
$\mathcal{K}$: a flag indicating if the property is part of the key
$\mathcal{D}$: The domain of the property A mapping relation may be thought of as a pivoted form of mapping, where each row represents a property-to-property mapping for a given set of conditions. For example, for FIG. 3, the mapping may be expressed using Entity Framework as follows:

$\pi_{ID,Name}\text{Thing} = \pi_{EID,EName}\text{TEntity}$ $\pi_{ID,Contact}\sigma_{IS\ ONLY\ Company}\text{Thing} = \pi_{BID,CName}\text{TCorp}$ $\pi_{ID,Contact,CEO}\sigma_{IS\ Partner}\text{Thing} = \pi_{RID,Contact,CEO}\text{TPartner}$ $\pi_{ID,DOB}\sigma_{IS\ ONLYS\ tudent}\text{Thing} = \pi_{PID,DOB}\sigma_{Type="Student"}\text{TPerson}$ $\pi_{ID,DOB,Stipend,Major,Status}\sigma_{IS\ ONLY\ Student}\text{Thing} = \pi_{PID,BDay,Integer1,String1,Integer2}\sigma_{Type="Student"}\text{TPerson}$ $\pi_{ID,DOB,Office,Title,Salary}\sigma_{IS\ ONLY\ Student}\text{Thing} = \pi_{PID,BDay,String1,String2,Integer1}\sigma_{Type="Staff"}\text{TPerson}$ An EF mapping fragment $\pi_{\vec{P}}\sigma_{\vec{F}} E = \pi_{\vec{C}}\sigma \vec{G}\ T$ may be translated into rows in the mapping relation as follows: for each property p∈P, create the row (E',p,$\vec{F'}$,T,c,$\vec{G}$,k,d), where:

E' is the entity type that participates in the IS or IS ONLY condition of $\vec{F}$, or E if no such conditions exist $\vec{F'}$ is the set of conditions $\vec{F}$ with any IS or IS ONLY condition removed c is the column that matches p in the order of projected columns k is a boolean indicating whether the property is a key property d is a string value indicating the domain of the property To translate an entire EF mapping to a mapping relation instance, the above translation may be performed for each constituent mapping fragment. Table 1 shows a mapping relation for the models and mapping in FIG. 3.

TABLE 1

A mapping relation for the models and mappings of FIG. 3.
The column CC is not shown, since the mapping has no client conditions.

| CE | CP | ST | SC | SX | K | D |
|---|---|---|---|---|---|---|
| Thing | ID | TEntity | EID | — | Yes | Guid |
| Thing | Name | TEntity | EName | — | No | Text |
| Company | ID | TCorp | BID | — | Yes | Guid |
| Company | Contact | TCorp | CName | — | No | Text |
| Partner | ID | TPartner | RID | — | Yes | Guid |
| Partner | Contact | TPartner | Contact | — | No | Text |
| Partner | CEO | TPartner | CEO | — | No | Text |
| Person | ID | TPerson | PID | Type=Person | Yes | Guid |
| Person | DOB | TPerson | BDay | Type=Person | No | Date |
| Student | ID | TPerson | PID | Type=Student | Yes | Guid |
| Student | DOB | TPerson | BDay | Type=Student | No | Date |
| Student | Stipend | TPerson | Integer1 | Type=Student | No | Integer |
| Student | Major | TPerson | String1 | Type=Student | No | Text |
| Student | Status | TPerson | Integer2 | Type=Student | No | Integer |
| Staff | ID | TPerson | PID | Type=Staff | Yes | Guid |
| Staff | DOB | TPerson | BDay | Type=Staff | No | Date |
| Staff | Office | TPerson | String1 | Type=Staff | No | Text |
| Staff | Title | TPerson | String2 | Type=Staff | No | Text |
| Staff | Salary | TPerson | Integer1 | Type=Staff | No | Integer |

The rows in the mapping relation do not need to maintain IS or IS ONLY conditions because they are intrinsic in the mapping relation representation. The IS condition is satisfied by any instance of the specified type, while the IS ONLY condition is only satisfied by an instance of the type that is not also an instance of any derived type. In the mapping relation, the IS condition is represented by rows in the relation where non-key entity properties have exactly one represented row (e.g., Thing.Name in Table 1). The IS ONLY condition is represented by properties that are mapped both by the declared type and by its derived types (e.g., Company.Contact and Partner.Contact in Table 1 ).

To create a mapping relation, patterns may be identified that exist in the mapping in the local scope of the schema of objects being added or changed. Before defining local scope, the similarily of two types in a hierarchy is discussed. Similarity may be formalized using the following notions:

An entity type is most like its siblings.

Two entity types X and Y, neither a descendant of the other, are more similar to each other than to their least common ancestor.

If entity type X is a descendant of entity type Y, then X is more similar to any of Y's descendants than Y, but more similar to Y than any of Y's ancestors, siblings, or siblings' descendants.

Figure 4:
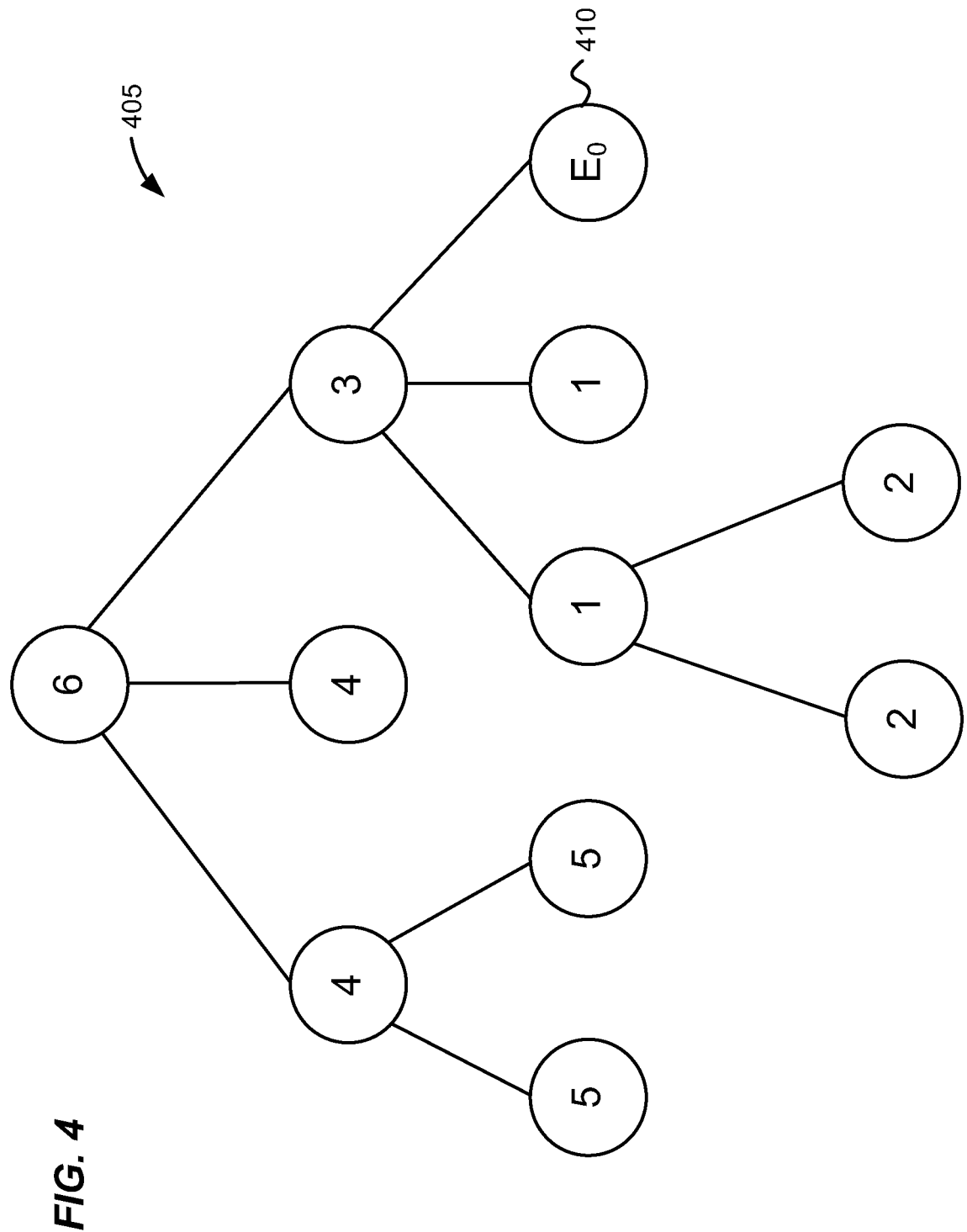
FIG. 4 is a block diagram that generally represents an exemplary similarity representation in accordance with aspects of the subject matter described herein.

FIG. 4 is a block diagram that generally represents an exemplary similarity representation that follows the rules above in accordance with aspects of the subject matter described herein. Each of the nodes of a hierarchy 405 has a number that corresponds to the similarity to the node 410. A lower number indicates closer similarity.

In one implementation, the similarity notions may be formalized by assigning to each type in a hierarchy a pair of integers (m, n) relative to a given entity type $E_0$ that belongs to the hierarchy (or is just added to it) according to the following algorithm:

1. Assign the pair (0,0) to type $E_0$ and all of its siblings.
2. For each type E with assigned pair (m, n), if E's parent is unassigned, assign to it the pair (m+2, n). Apply this rule until no new pair assignments can be made.
3. For each type E with assigned pair (m, n), assign the pair (m+1, n) to any of E's siblings that have no assigned pair. Apply this rule once for each type that has assigned pairs from step 2.
4. For each type E, if E has no pair and E's parent has the pair (m, n), assign to E the pair (m, n+1). Apply this rule repeatedly until no new pair assignments can be made.

Once the above steps have been completed, every type in the hierarchy will be assigned a pair. The priority score $\mathcal{P}(E, E_0)$ for an entity type E in a hierarchy relative to $E_0$ is computed from its pair (m, n) as $\mathcal{P}(E, E_0) = 1 + m - 2^{-n}$.

The priority score may be used to formalize the notion of local scope. The local scope $\Phi(E_0)$ of an entity type $E_0$ may be defined as follows. Let $\vec{H} = \{E_1, E_2, \ldots\}$ be the ordered list of entity types $E_i$ in $E_0$'s hierarchy such that $\sigma_{CE=E_i} \mathcal{M} \neq \phi$ (i.e., there exists mapping information for $E_i$; some types may be abstract and not have any mapping defined). List $\vec{H}$ is sorted on priority score, so $\mathcal{P}(E_i, E_0) \leq \mathcal{P}(E_{i+1}, E_0)$ for all indexes i. Then:

If $|\vec{H}| \leq 2$, then $\Phi(E) = \vec{H}$.

If $|\vec{H}| > 2$, then $\Phi(E)$ may be constructed by taking the first two elements in $\vec{H}$, plus any elements with the same priority score as either of those elements.

This construction of the local scope ensures that the informal notions described earlier are met. For instance, if an entity type E has priority score x relative to $E_0$, then all of E's siblings will also have priority score x unless one sibling is an ancestor $E_o$. Consequently, if $E \in \Phi(E_0)$, then any sibling E' that has associated mappings will also be in $\Phi(E)$.

Using the mapping relation and notion of local scope, the mapping itself may be used as data to mine the various mapping schemes. A mapping pattern may be defined as a query $Q^+$ that probes for the existence of the requested mapping scheme and returns either true or false. The first set of patterns search for one of the three prominent hierarchy mapping schemes mentioned previously, given a local scope $\Phi(E)$ for an entity type E:

Table-Per-Hierarchy (TPH): Given an entity type E and a child type E', map them to a single table T. Given local scope $\Phi(E)$, the TPH pattern is:

$Q_{TPH}^+(|\pi_{ST}\sigma_{CE\in\Phi(E)}\mathcal{M}|=1)$.

Table-Per-Type (TPT): Given an entity type E and a child type E', map them to tables T and T' respectively, with properties of E mapped to T and properties of E' not present in E mapped to T'. Given local scope $\Phi(E)$, the TPT pattern is:

$Q_{TPT}^+ \equiv (\forall_{E'\,E''\in\Phi(E)}\pi_{SE}\sigma_{CE=E'}\mathcal{M} \cap \pi_{SE}\sigma_{CE=E''}\mathcal{M} = \phi)$ $\wedge (\forall_{E'\in\Phi(E)}\forall_{P\in NKP(E')}|\sigma_{CP=P}\sigma_{CE=E'\cap CEinheritsfromE'}\mathcal{M}|=1)$ where NKP(E) is the set of non-key properties for entity type E that are declared in E (i.e., do not include properties derived from ancestors of E).

Table-Per-Concrete Class (TPC): Given an entity type E and a child type E', map them to tables T and T' respectively, with properties of E mapped to T and properties of E'(including properties inherited from E) mapped to T'. Given local scope $\Phi(E)$, where A is the least common ancestor of all entity types in $\Phi(E)$, the TPC pattern is:

$Q_{TPT}^+ \equiv (\forall_{E'\,E''\in\Phi(E)}\pi_{SE}\sigma_{CE=E'}\mathcal{M} \cap \pi_{SE}\sigma_{CE=E''}\mathcal{M} = \phi)$ $\wedge (\forall_{E'\in\Phi(E)}\forall_{P\in NKP(A)}|\sigma_{CP=P}\sigma_{CE=E'}\mathcal{M}|=1)$ If an instance is found of the TPH scheme using the associated pattern, a further distinction may be made based on how the existing mapping reuses store columns using a second selection of patterns. Column mapping patterns do not use local scope, but rather look at the entire mapping table for all entities that map to a given table. The set of considered entities may be expanded to yield enough data to exhibit a pattern.

Remap by Column Name (RBC): If types E and E' are cousin types in a hierarchy, and both E and E' have a property named P with the same domain in each, then E.P and E'.P are mapped to the same store-side column. Cousin types belong to the same hierarchy, but neither is a descendant of the other. This mapping scheme maps all properties with like names to the same column. Given hierarchy table T, the RBC pattern is:

$Q_{RBC}^+ \equiv (\exists_{C\in\pi_{SC}\sigma_{ST=T}\sigma_{\neg K}\mathcal{M}}|\sigma_{CP\in NKP(CE)}$
$\sigma_{ST=T}\wedge_{SC=C}\mathcal{M}|>1)$ $\wedge (\forall_{C\in\pi_{SC}\sigma_{ST=T}\sigma_{\neg K}\mathcal{M}}|\pi_{CP}\sigma_{CP\in NKP(CE)}\sigma_{ST=T}$
$\wedge_{SC=C}\mathcal{M}|=1)$ In other words, the pattern recognizer may look for a store column that is remapped, such that each store column can be associated with a unique client property name.

Remap by Domain (RBD): If types E and E' are cousin types in a hierarchy, let $\vec{P}$ be the set of all properties of E with domain D (including derived properties), and $\vec{P}'$ be the set of all properties of E' with the same domain D. If $\vec{C}$ is the set of all columns to which any property in $\vec{P}$ or $\vec{P}'$ map, then $|\vec{C}|=\max(|P|, |\vec{P}'|)$. In other words, the mapping re-uses columns to reduce table size and increase table value density, even if properties with different names map to the same column. Said another way, if a new property $P_0$, were added to an entity type mapped using the TPH scheme, map it to any column $C_0$ such that $C_0$ has the same domain as $P_0$ and is not currently mapped by any property in any descendant type, if any such column exists. Given hierarchy table T, the RBD pattern is:

$Q_{RBD}^+ \equiv (\exists_{C\in\pi_{SC}\sigma_{ST=T}\sigma_{\neg K}\mathcal{M}}|\sigma_{CP\in NKP(CE)}\sigma_{ST=T\wedge SC=C}\mathcal{M}|>1)$ $\wedge (\forall_{X\in\pi_D\sigma_{ST=T\wedge\neg K}\mathcal{M}}\exists_{E\in\pi_{CE}\sigma_{ST=T}\mathcal{M}}|\pi_{CP}\sigma_{CE=E\wedge ST=T\wedge D=X\wedge\neg K}\mathcal{M}| =$ $|\pi_{SC}\sigma_{ST=T\wedge D=X\wedge\neg K}\mathcal{M}|)$.

There is at least one store column that is remapped, and for each domain, there is some client entity that uses all available columns of that domain.

Fully Disjoint Mapping (FDM): If types E and E' are cousin types in a hierarchy, the non-key properties of E will map to a set of columns disjoint from the non-key properties of E'. This pattern reduces ambiguity of column data provenance—given a column C, all of its non-null data values will belong to instances of a single entity type. Given hierarchy table T, the FDM pattern is:

$Q_{FDM}^+ \equiv \forall_{C\in\pi_{SC}\sigma_{ST=T}\sigma_{\neg K}\mathcal{M}}|\sigma_{CP\in NKP(CE)}\sigma_{ST=T}$
$\wedge_{SC=C}\mathcal{M}|=1$.

Each store column is uniquely associated with a declared entity property.

In addition to hierarchy and column mapping schemes, other transformations may exist between client types and store tables. For instance:

Horizontal Partitioning (HP): Given an entity type E with a non-key property P, instances of E may be partitioned across tables based on values of P.

Store-Side Constants (SSC): A column may be assigned to hold a particular constant. For instance, the column C may be assigned a value v that indicates which rows were created through the ORM tool, and consequently limit any queries against the database to rows in the table where C=v (and thus eliminate any rows that may have come from an alternative source).

In one embodiment, pattern recognition may be omitted for these last two schemes through use of an algorithm described below that carries such schemes forward automatically. Other similar schemes include vertical partitioning and merging, determining whether a TPH hierarchy uses a discriminator column (as opposed to patterns of NULL and NOT NULL conditions), and association inlining (i.e., whether one-to-one and one-to-many relationships are represented as foreign key columns on the tables themselves or in separate tables).

Each group of patterns may not be complete on its own. For example, the local scope of an entity may be too small to find a consistent pattern or may not yield a consistent pattern (e.g., one sibling is mapped TPH, while another is mapped TPC). In cases where consistency is not present, a global default may be used. If a consistent column mapping scheme is not recognized, a disjoint pattern may be used. If consistent condition patterns like store constants or horizontal partitioning are not recognized, any store and client conditions that are not relevant to TPH mapping may be ignored.

Once a pattern is detected in the mapping, an incremental change may be made to the mapping and the store based on the nature of the change. The incremental changes may fall into categories including, for example:

Actions that Add Constructs: Changes may occur that add entity types to a hierarchy, add a new root entity type, add properties, or add associations. Setting an abstract entity type to be concrete is also a change of this type. For changes of this kind, new rows may be added to the mapping relation, but existing rows are left alone.

Actions that Remove Constructs: Changes may occur that drop any of the above artifacts, or set a concrete entity type to be abstract. For changes of this kind, rows may be removed from the mapping relation, but no rows are changed or added.

Actions that Alter Construct Attributes: Changes may occur that change individual attributes, or "facets", of artifacts. Examples of this include changing the maximum length of a string property or the nullability of a property. For such changes, the mapping relation remains invariant, but is used to guide changes to the store.

Actions that Refactor or Move Model Artifacts: Changes may occur that take model artifacts and transform them in a way that is information-lossless or that is more information-preserving than a set of steps that achieve the same client change but lose additional information, such as renaming a property (as opposed to dropping the property and re-adding it). Other examples of this include transforming a one-to-one association into an inheritance, moving an entity type's property to its parent or to a child, or changing the cardinality of an association's endpoint. Changes of this kind may result in arbitrary changes to the mapping relation, but such changes are often similar to (and thus re-use logic from) changes of the other three kinds.

The set of possible changes may be said to be closed in that any client model $M_1$ may be evolved to any other client model $M_2$ by dropping any elements they do not have in common and adding the ones unique to $M_2$. The other supported changes (e.g., property movement, changing the default value for a property, and so forth) may be accomplished by drop-add pairs or atomic actions that preserve data. Below are algorithms for processing a cross-section of the supported model changes.

Adding a New Type to the Hierarchy: When adding a new type to a hierarchy, the following three issues are addressed: how many new tables need to be created, what existing tables are to be re-used, and how many derived properties need to be remapped. Any declared properties of the new type may be assumed to be added as separate "add property" actions. When a new entity type E is added, the AddNewEntity(E) algorithm below may be used:

1. AddNewEntity(E):
2.    $k \leftarrow$ a key column for the hierarchy
3.    $\vec{G} \leftarrow \gamma_{CX}\sigma_{CP=k \wedge CE \in \Phi(E)}\mathcal{M}$, where $\gamma_{CX}$ groups rows of the mapping relation according to their client conditions -continued 4.    If $\exists_i \rightarrow |\pi_{CE}T_i| \neq |\Phi(E)|$ then $\vec{G} \leftarrow \{\sigma_{CP=k \wedge CE \in \Phi(E)}\mathcal{M}\}$
(i.e., if there is no consistent horizontal partition across entity types, then just create one large partition, ignoring client-side conditions)
5.    For each $G \in \vec{G}$:
6.       If $Q_{TPT}^+(G)$: (i.e., if TPT pattern is found when run just on the rows in G)
7.          For each property $P \in \text{Keys}(E) \cup \text{NKP}(E)$:
8.             $F \leftarrow$ GenerateTemplate(G)
9.             Add NewMappingRow(F, E)
10.      If $Q_{TPT}^+(G)$ or $Q_{TPC}^+(G)$:
11.          $A \leftarrow$ the common ancestor of $\Phi(E)$
12.          For each property $P \in \text{Keys}(E) \cup \bigcap_{e \in \vec{E}} \text{NKP}(E)$ where $\vec{E}$ is the set of all entities between E and A in the hierarchy, inclusive:
13.             $F \leftarrow$ GenerateTemplate(G, P)
14.             Add NewMappingRow(F, E)

Function GenerateTemplate($\vec{R}$,P) is defined as follows: a mapping template T is created as a derivation from a set of existing rows $\vec{R}$, limited to those where CP=P. For each column $C \in \{CE, CP, ST, SC\}$, set T.C to be X if $\forall_{r \in \vec{R}} r.C = X$. Thus, for example, if there is a consistent pattern mapping all properties called ID to columns called PID, that pattern is continued. Otherwise, set T.C=⊗, where ⊗ is a symbol indicating a value to be filled in later.

For condition column CX (and SX), template generation follows a slightly different path. For any condition C=v, C IS NULL, or C IS NOT NULL that appear in every CX (or SX) field in $\vec{R}$ (treating a conjunction of conditions as a list that can be searched), and the value v is the same for each, add the condition to the template. If each row $r \in \vec{R}$ contains an equality condition C=v, but the value v is distinct for each row r, add condition C=⊗ to the template. Ignore all other conditions.

Table 2 shows an example of generating a mapping template for a set of rows corresponding to a TPH relationship. The rows for this example are drawn from Table 1, with additional client and store conditions added to illustrate the effect of the algorithm acting on a single horizontal partition and a store constant. As shown in Table 2, the partition conditions and store conditions translate to the template. Also shown in Table 2, the name of the store column remains consistent even though it is not named the same as the client property.

TABLE 2

Creating the mapping template for a type added using a TPH scheme, over a single horizontal partition where "Editor=Tom" and with a store-side constant "Source=A". The final row shows the template filled in for a new type Alumnus.

| CE | CP | CX | ST | SC | SX | K | D |
|---|---|---|---|---|---|---|---|
| Person | ID | Editor=Tom | TPerson | PID | Type=Person AND Source=A | Yes | Guid |
| Student | ID | Editor=Tom | TPerson | PID | Type=Student AND Source=A | Yes | Guid |
| Staff | ID | Editor=Tom | TPerson | PID | Type=Staff AND Source=A | Yes | Guid |

TABLE 2-continued

Creating the mapping template for a type added using a TPH scheme, over a single horizontal partition where "Editor=Tom" and with a store-side constant "Source=A". The final row shows the template filled in for a new type Alumnus.

| CE | CP | CX | ST | SC | SX | K | D |
|---|---|---|---|---|---|---|---|
| ⊗ | ID | Editor=Tom | TPerson | PID | Type=⊗ AND Source=A | Yes | Guid |
| Alumnus | ID | Editor=Tom | TPerson | PID | Type=Alumnus AND Source=A | Yes | Guid |

The function NewMappingRow(F, E) takes a template F and fills it in with details from E. Any ⊗ values in CE, CX, ST, and SX are filled with value E. Translating these new mapping table rows back to an EF mapping fragment is straightforward. For each horizontal partition, take all new rows collectively and run the algorithm for translating an EF mapping fragment into rows (mentioned previously) backwards to form a single fragment.

Adding a New Property to a Type: When adding a new property to a type, an evolution component may determine which descendant types also need to remap the property, and to which tables is the property to be added. The algorithm for adding property P to type E is similar to adding a new type:

For each horizontal partition, determine the mapping scheme for Φ(E).

If the local scope has a TPT or TPC scheme, add a new store column and a new mapping row that maps to it. Also, for any child types whose local scope is mapped TPC, add a column and map to it as well.

If the local scope has a TPH scheme, detect the column remap scheme. If remapping by name, see if there are other properties with the same name, and if so, map to the same column. If remapping by domain, see if there is an available column with the same domain and map to it. Otherwise, create a new property and map to it. Add a mapping row for all descendant types that are also mapped TPH.

Translating these new mapping rows backward to the existing EF mapping fragments is straightforward. Each new mapping row may be translated into a new item added to the projection list of a mapping fragment. For a new mapping row N, find the mapping fragment that maps $\sigma_{N.CX} N.CE = \sigma_{N.SX} N.ST$ and add N.CP and N.SC to the client and store projection lists respectively.

Changing or Dropping a Property: A mapping relation may be leveraged to propagate schema changes and deletions through a mapping as well. In a scenario where the user wants to increase the maximum length of Student.Major to be 50 characters from 20, a mapping relation may be used to cause this change as follows. First, if E.P is the property being changed, issue query $\pi_{ST,SC} \sigma_{CE=E \wedge CP=P} \mathcal{M}$ (i.e., find all columns that property E.P maps to). This may result in more than one column if there is horizontal partitioning. Then, for each result row t, issue query $Q = \pi_{CE,CP} \sigma_{ST=t.ST \wedge SC=t.SC} \mathcal{M}$. This finds all properties that map to the same column. Finally, for each query result, set the maximum length of the column t.SC in table t.SE to be the maximum length of all properties in the result of query Q.

For the Student.Major example, the property only maps to a single column TPerson.String1. All properties that map to TPerson.String1 are shown in Table 3 below.

TABLE 3

A listing of all properties that share the same mapping as Student.Major.

| CE | CP | ST | SC | SX | K | D |
|---|---|---|---|---|---|---|
| Student | Major | TPerson | String1 | Type=Student | No | Text |
| Staff | Office | TPerson | String1 | Type=Staff | No | Text |

If Student.Major changes to length 50, and Staff.Office has maximum length 40, then TPerson.String1 needs to change to length 50 to accommodate. However, if Major already has a length of 100, then TPerson.String1 is already large enough to accommodate the wider Major property.

Dropping a property follows the same algorithm, except that the results of query Q are used differently. If query Q returns more than one row, that means multiple properties map to the same column, and dropping one property will not require the column to be dropped. However, if r is the row corresponding to the dropped property, then a statement may be issued that sets r.SC to NULL in table r.ST for all rows that satisfy r.SX. So, the statement UPDATE TPerson SET String1=NULL WHERE Type='Student' may also be executed when dropping Student.Major. If query Q returns only the row for the dropped property, then the column may be deleted. In both cases, the row r is removed from $\mathcal{M}$. We refer to the process of removing the row r and either setting values to NULL or dropping a column as DropMappingRow(r).

In one embodiment, when the query Q returns only a row for the dropped property, the data is deleted. In another embodiment, the column is dropped from storage. In another embodiment, the column is removed from the storage model available to the ORM while the column and data remain in the database invisible to the ORM.

Moving a Property from a Type to a Child Type: If entity type E has a property P and a child type E', a visual designer may be used to specify that the property P is to be moved to E'. In this case, all instances of E' keep their values for property P, while any instance of E that is not an instance of E' drops its P property. This action may be modeled using analysis of the mapping relation $\mathcal{M}$ as well. If there are no client-side conditions, the property movement algorithm is as follows:

1. MoveClientProperty(E, P, E'):
2.     $r_0 \leftarrow \sigma_{CE=E \wedge CP=P} \mathcal{M}$ (without client conditions, this is a single row)
3.     If $|\sigma_{CE=E' \wedge CP=P} \mathcal{M}| = 0$: (E' is mapped TPT relative to E)
4.         AddProperty(E', P) (act as if adding property P to E')
5.     For each $r \in \sigma_{CE=E' \vee CE \in Descendants(E')} \sigma_{CP=P} \mathcal{M}$
6.         UPDATE r.ST SET r.SC = (r.ST ⊳⊲ $r_0$.ST).(r.SC) WHERE r.SX -continued 7.     $\vec{E}^- \leftarrow$ all descendants of E, including E but excluding E' and descendants
8.     For each $r \in \sigma_{CE \in \vec{E}^-{}_{\wedge CP=P}} \mathcal{M}$ and
9.           DropMappingRow(r) (drop the mapping row effect changes to the physical database per the Drop Property logic in the previous case)

Figure 5:
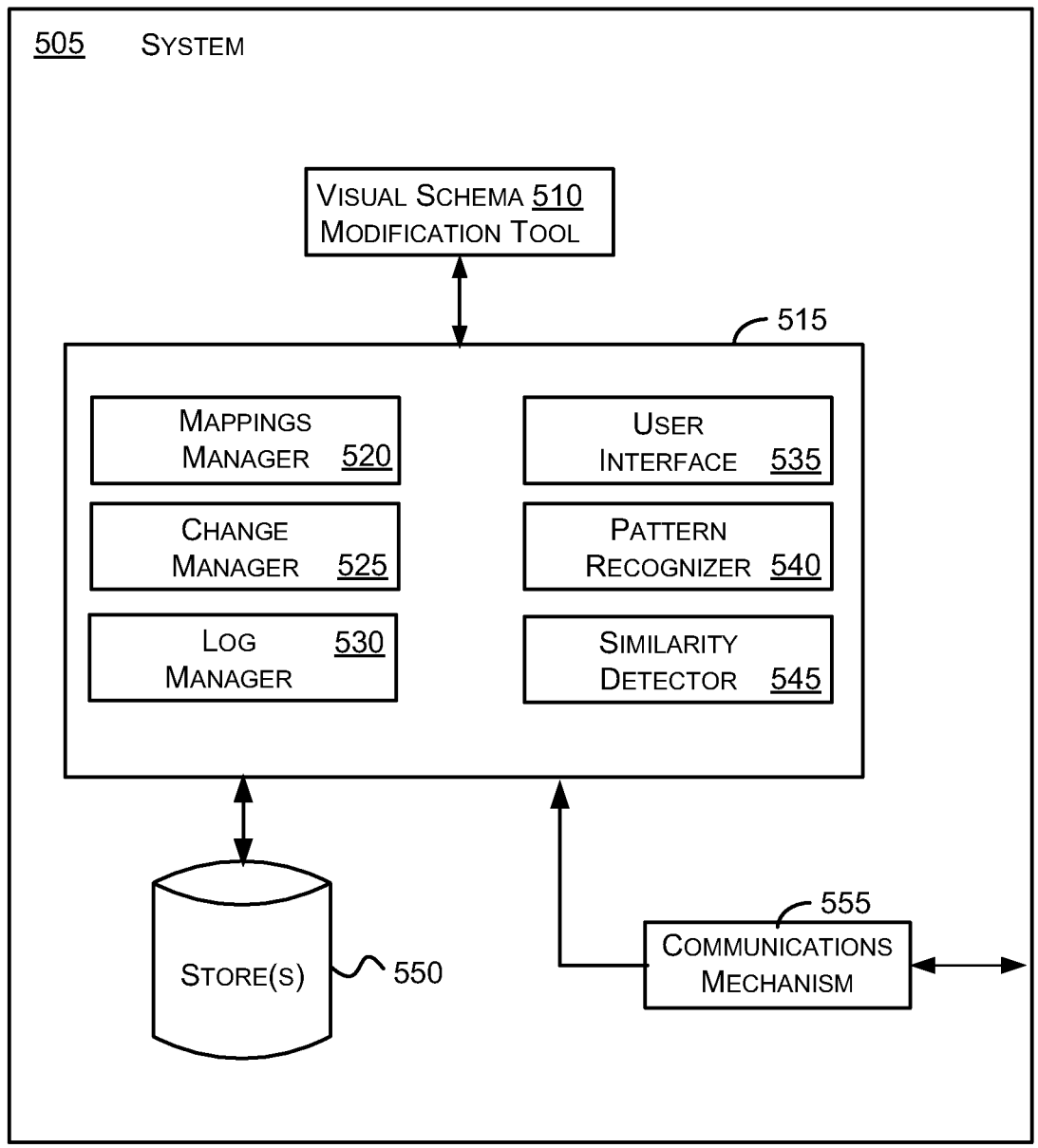
FIG. 5 is a block diagram representing an exemplary arrangement of components of a system in which aspects of the subject matter described herein may operate.

FIG. 5 is a block diagram representing an exemplary arrangement of components of a system in which aspects of the subject matter described herein may operate. The components illustrated in FIG. 5 are exemplary and are not meant to be all-inclusive of components that may be needed or included. In other embodiments, the components and/or functions described in conjunction with FIG. 5 may be included in other components (shown or not shown) or placed in subcomponents without departing from the spirit or scope of aspects of the subject matter described herein. In some embodiments, the components and/or functions described in conjunction with FIG. 5 may be distributed across multiple devices.

Turning to FIG. 5, the system 505 may include a visual schema modification tool 510, evolution components 515, store(s) 550, a communications mechanism 555, and other components (not shown). The system 505 may comprise one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where the system 505 comprises a single device, an exemplary device that may be configured to act as the system 505 comprises the computer 110 of FIG. 1. Where the system 505 comprises multiple devices, each of the multiple devices may comprise a similarly or differently configured computer 110 of FIG. 1.

The evolution components 515 may include a mappings manager 520, a change manager 525, a log manager 530, a user interface 535, a pattern recognizer 540, a similarity detector 545, and other components (not shown). As used herein, the term component is to be read to include all or a portion of a device, a collection of one or more software modules or portions thereof, some combination of one or more software modules or portions thereof and one or more devices or portions thereof, and the like.

The communications mechanism 555 allows the system 505 to communicate with other entities. For example, the communications mechanism 555 may allow the system 505 to communicate with applications or database management systems (DBMSs) on remote hosts. The communications mechanism 555 may be a network interface or adapter 170, modem 172, or any other mechanism for establishing communications as described in conjunction with FIG. 1.

The store(s) 550 include any storage media capable of providing access to data. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store(s) 550 may comprise hard disk storage, other non-volatile storage, volatile memory such as RAM, other storage, some combination of the above, and the like and may be distributed across multiple devices. The store(s) 550 may be external, internal, or include components that are both internal and external to the system 505.

The store(s) 550 may host databases and may be accessed via corresponding DBMSs. Access as used herein may include reading data, writing data, deleting data, updating data, a combination including two or more of the above, and the like.

The visual schema modification tool 510 includes any processes that may be involved in creating, deleting, or updating conceptual data (also known as schema data). Such processes may execute in user mode or kernel mode. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In some embodiments, the visual schema modification tool 510 may be incorporated in an integrated development environment (IDE) that allows software developers to develop software and create and maintain associated databases.

The mappings manager 520 may be operable to update mappings in accordance with a detected mapping pattern. For example, if a new type is added and a TPT pattern is detected, the mappings manager 520 may follow the TPT pattern in updating mappings for the mapping pattern.

The change manager 525 may be operable to indicate a change to a conceptual model to other of the evolution components 515 so that the other components may correct evolve mappings in accordance with the change. The change manager 525 may obtain a change from the log manager 530 that is operable to store information regarding changes to a log. The log manager 530 may receive indications of changes from the user interface 535 and store the indications for subsequent retrieval. which may receive the indications via user input hardware from the visual schema modification tool 510.

The similarity detector 545 may be operable to determine two or more of the types that are more similar to the affected type than any other of the types, the similarity detector operable to follow the following rules (previously mentioned) in determining similarity:

a type is most similar to its siblings, a first type and a second type, neither a descendant of the other, are more similar to each other than to a least common ancestor of the first and second types, and if a first type is a descendant of a second type, then the first type is more similar to any descendants of the second type than to the second type, but more similar to the second type than any of ancestors, siblings or descendents of the siblings than any ancestors of the second type.

The pattern recognizer 540 may be operable to determine a mapping pattern between the two or more types determined by the similarity detector 545 and elements in the second schema.

Figure 8:
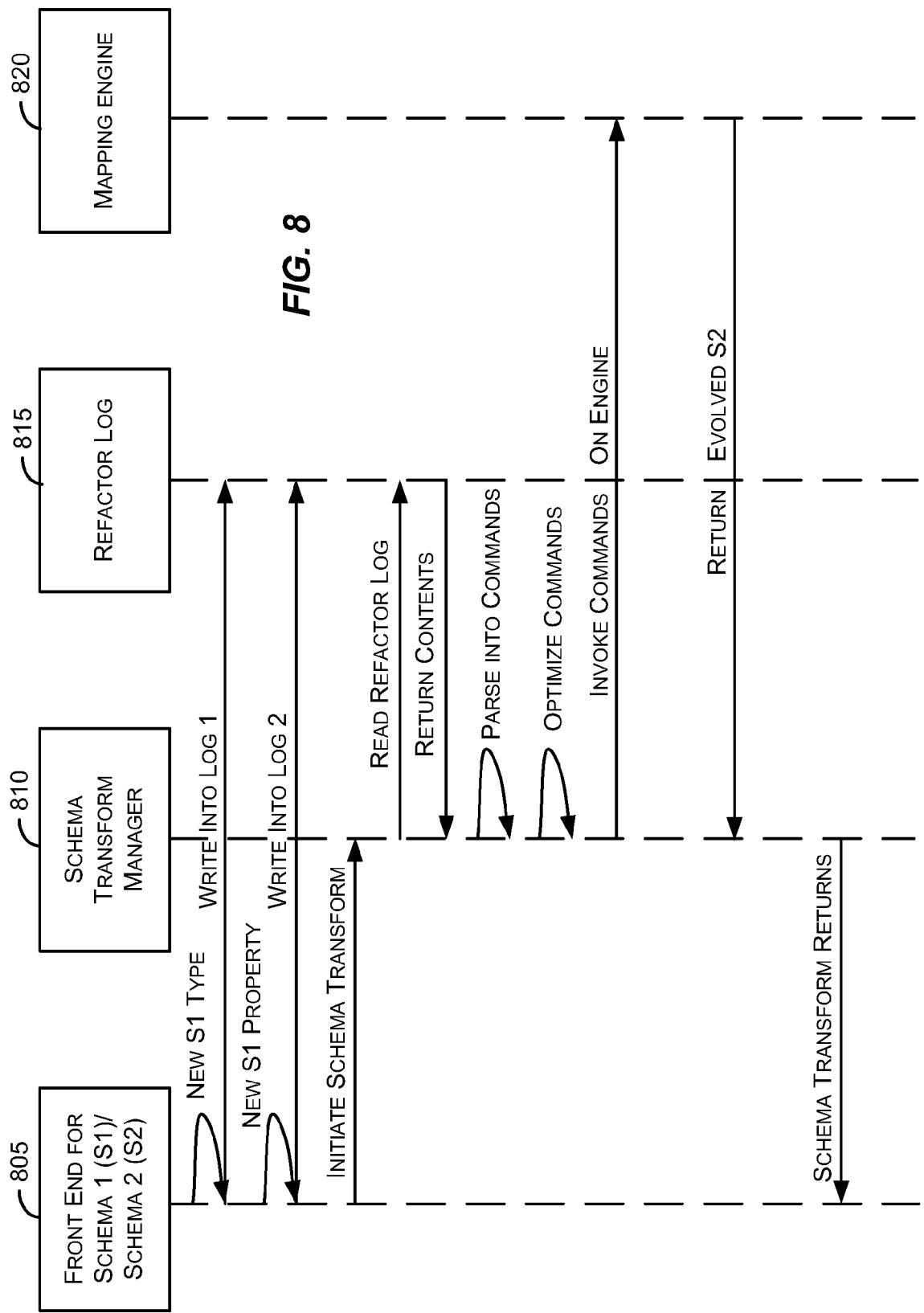
FIG. 8 is a timing diagram that generally represents exemplary actions that may occur when a conceptual model is changed in accordance with aspects of the subject matter described herein.

FIG. 8 is a timing diagram that generally represents exemplary actions that may occur when a conceptual model is changed in accordance with aspects of the subject matter described herein. The front end 805 corresponds to the visual schema modification tool 510 of FIG. 5. The schema transform manager 810 corresponds to one or more of the evolution components 515 of FIG. 5. The refactor log 815 corresponds to the log manager 530 which stores and retrieves changes made to a schema. The mapping engine 820 corresponds to a component that makes changes to model stores and data thereon. The actions illustrated in FIG. 8 illustrate some exemplary actions that may occur when a new type and property are added to a conceptual model.

Figure 6:
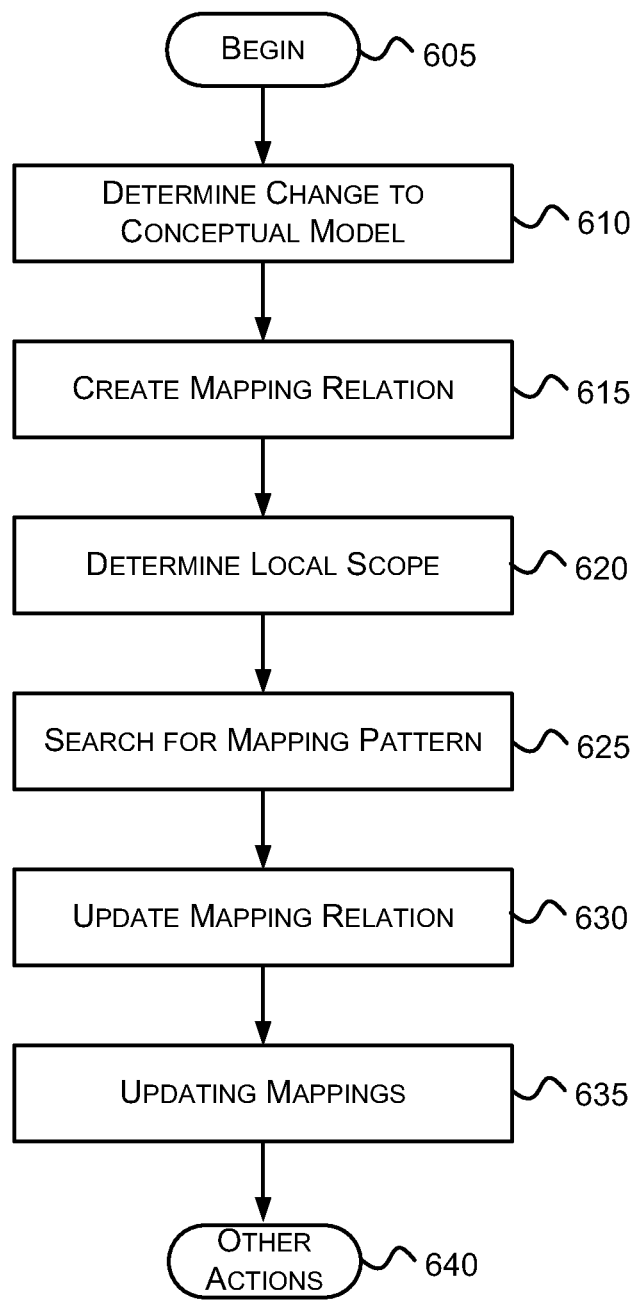
FIGS. 6-7 are flow diagrams that generally represent exemplary actions that may occur in accordance with aspects of the subject matter described herein.
Figure 7:
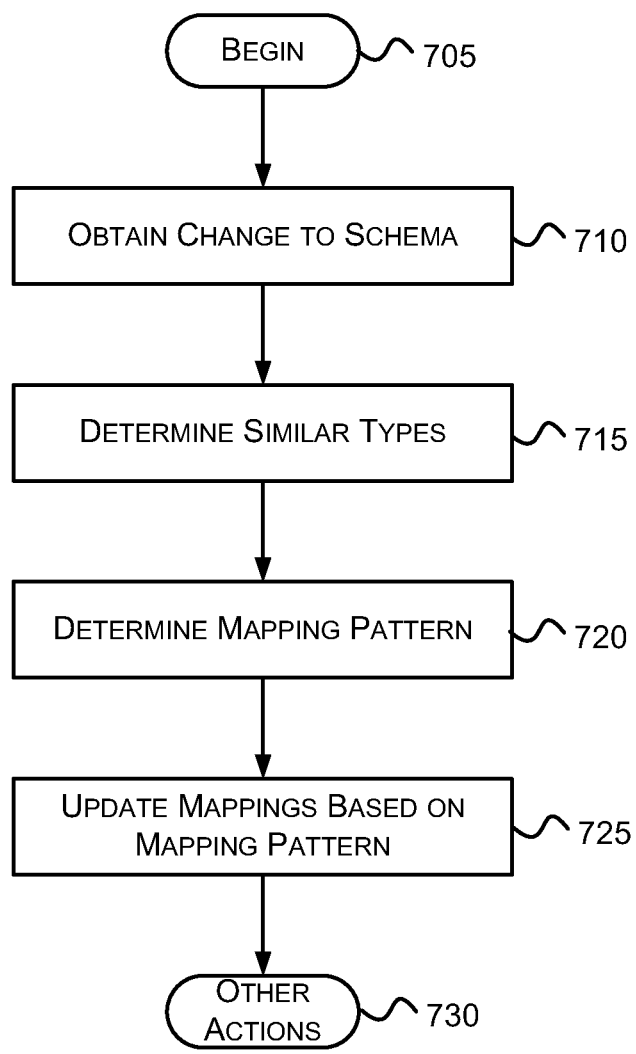

FIGS. 6-7 are flow diagrams that generally represent exemplary actions that may occur in accordance with aspects of the subject matter described herein. For simplicity of explanation, the methodology described in conjunction with FIGS. 6-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 6, at block 605, the actions begin. At block 610, a change to a conceptual model is determined. For example, referring to FIG. 2, it may be determined that the new type 205 has been added to the conceptual model. As has been indicated previously, the conceptual model is mapped to a store model, and the conceptual model includes a hierarchy of types. The change may be determined by reading an indication of the change from a change log, via interaction with a visual schema modification tool, some other way, or the like.

At block 615, a mapping relation is created that represents mappings between types of the conceptual model and elements of the store model. This may be done, for example, by creating a table where each row of the table represents a property-to-property mapping between a property of the conceptual model and a corresponding element of the store model. This may also be done by creating a data structure such that represents a tuple, where the tuple includes:

conceptual model entity type, property, and conditions, if any;

store model table, column, and conditions, if any;

a flag that indicates whether the property is part of a key; and a domain of the property At block 620, a local scope of the mapping relation is determined. The local scope indicates relevant (e.g., similar) mappings to use to identify a pattern for modifying the mapping relation to be consistent with the change. For example, referring to FIGS. 4 and 5, the similarity detector 545 may identify the two most similar nodes to the node 410.

At block 625, a search for a mapping pattern in the local scope is performed. Here, the mapping pattern indicates how other types of the local scope have been mapped to elements of the store model. For example, referring to FIG. 5, the pattern recognizer 540 may search the mapping relation previously created to find mapping patterns for the local scope.

At block 630, the mapping relation is updated based on the change and the mapping pattern. For example, if a new type is added and the pattern is TPT, one or more rows mapping the new type to a new table may be added to the mapping relation.

At block 635, the mappings are updated. The mappings may be updated by translating the mapping relation back to the mappings data. In one embodiment, this may be performed by running the algorithm for translating an EF mapping fragment into rows (mentioned previously) backwards to form one or more fragments.

At block 640, other actions, if any, may be performed.

Turning to FIG. 7, at block 705, the actions begin. At block 710, a change to a schema is obtained. The change involves (i.e., affects) at least one of the types. For example, referring to FIG. 5, the change manager 525 obtains a change from the log manager 530.

At block 715, two or more other types (if available) that are most similar to the affected type(s) are determined. For example, referring to FIG. 4, the types with 1's may be determined to be the most similar to the affected type of the node 410. Determining these two or more types may include, for example, creating a table that represents the mappings in a pivoted form wherein each row of the table represents a property-to-property mapping for a given set of conditions and performing a query on the table as described previously.

At block 720, a mapping pattern is determined between the two or more types and elements of the store model. For example, if both of the types are mapped to tables in the database schema, the mapping pattern may be determined to be table-per-type.

At block 725, the mappings between the client model and the store model may be updated based on the mapping pattern and change. For example, if a new table has been added to the store model for a new type, the mappings may be updated to include a mapping from the new type to the new table.

At block 730, other actions, if any may be performed. For example, other actions may include updating one or more databases that conform to the store model in a manner to preserve existing data that is not to be deleted in response to the change. One such manner, for example, includes renaming an element in the store model instead of dropping a first element and adding a second element.

As can be seen from the foregoing detailed description, aspects have been described related to automating evolution of schemas and mappings. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

determining a change to a conceptual model that is mapped to a store model via mappings between types of the conceptual model and elements of the store model, the conceptual model including a hierarchy of types;

determining a local scope that indicates relevant mappings to use to identify a pattern for modifying the mappings to be consistent with the change;

searching for a mapping pattern of the local scope, the mapping pattern indicating how other types of the local scope have been mapped to elements of the store model; and updating the mappings between the conceptual model and the store model using the mapping pattern of the local scope.

2. The method of claim 1, further comprising storing indications of changes made to the conceptual model in a change log and wherein determining a change to a conceptual model comprises reading an indication of the change from the change log.

3. The method of claim 1, wherein creating a mapping relation comprises creating a table in which each row of the table represents a property-to-property mapping between a property of the conceptual model and a corresponding element of the store model.

4. The method of claim 1, wherein determining a local scope comprises:
   assigning a pair (0,0) to a type of the hierarchy and all of the type's siblings;
   for each type with an assigned pair (m, n), if the type's parent is not assigned a pair, assigning a pair (m+2, n) to the parent;
   for each type with an assigned pair (m, n), assigning a pair (m+1, n) to any siblings of the type that have no assigned pair;
   for each type that has no pair and whose parent has a pair (m, n), assigning a pair (m, n+1);
   for each type in the hierarchy, computing a priority score using the type's pair (m, n) using a formula of $1+m-2^{-n}$; and
   selecting types for the local scope based on the priority scores of the types.

5. The method of claim 1, wherein determining a local scope comprises identifying types in the conceptual model that are closest in the hierarchy to a type involved with the change.

6. The method of claim 1, wherein searching for a pattern in the local scope comprises determining whether each type in the local scope is mapped to the store model using table-per-type, table-per-concrete class, or table-per-hierarchy.

7. In a computing environment, a system comprising:
   at least one processor;
   a change manager configured to determine a change to a conceptual model that is mapped to a store model via mappings between types of the conceptual model and elements of the store model, the conceptual model including a hierarchy of types; a visual schema modification tool configured to create a mapping relation that represents the mappings between types of the conceptual model and elements of the store model by creating a tuple that includes: conceptual model entity type, property, and conditions, if any; store model table, column, and conditions, if any; a flag that indicates whether the property is part of a key; and a domain of the property;
   a similarity detector configured to determine a local scope that indicates relevant mappings to use to identify a pattern for modifying the mappings to be consistent with the change
   a pattern recognizer configured to search for a mapping pattern of the local scope, the mapping pattern indicating how other types of the local scope have been mapped to elements of the store model; and
   a mapping manager configured to update the mappings between the conceptual model and the store model using the mapping pattern of the local scope.

8. The system of claim 7 further comprising:
   a log manager configured to store indications of changes made to the conceptual model in a change log; and
   wherein the change manager is further configured to read an indication of the change from the change log.

9. The system of claim 7 wherein the visual schema modification tool is further configured to create a table in which each row of the table represents a property-to-property mapping between a property of the conceptual model and a corresponding element of the store model.

10. The system of claim 7 wherein the similarity detector is configured to determine the local scope by:
    assigning a pair (0,0) to a type of the hierarchy and all of the type's siblings;
    for each type with an assigned pair (m, n), if the type's parent is not assigned a pair, assigning a pair (m+2, n) to the parent;
    for each type with an assigned pair (m, n), assigning a pair (m+1, n) to any siblings of the type that have no assigned pair;
    for each type that has no pair and whose parent has a pair (m, n), assigning a pair (m, n+1);
    for each type in the hierarchy, computing a priority score using the type's pair (m, n) using a formula of $1+m-2^{-n}$; and
    selecting types for the local scope based on the priority scores of the types.

11. The system of claim 7 wherein the similarity detector is configured to determine the local scope by:
    identifying types in the conceptual model that are closest in the hierarchy to a type involved with the change.

12. The system of claim 7 wherein the pattern recognizer is configured to search for the mapping pattern in the local scope by:
    determining whether each type in the local scope is mapped to the store model using table-per-type, table-per-concrete class, or table-per-hierarchy.

13. A computer storage comprising volatile and non-volatile media having computer-executable instructions, which when executed perform actions, comprising:
    determining a change to a conceptual model that is mapped to a store model via mappings between types of the conceptual model and elements of the store model, the conceptual model including a hierarchy of types wherein the mappings include a tuple that includes: conceptual model entity type, property, and conditions, if any; store model table, column, and conditions, if any; a flag that indicates whether the property is part of a key; and a domain of the property;
    determining a local scope that indicates relevant mappings to use to identify a pattern for modifying the mappings to be consistent with the change;
    searching for a mapping pattern of the local scope, the mapping pattern indicating how other types of the local scope have been mapped to elements of the store model; and
    updating the mappings between the conceptual model and the store model using the mapping pattern of the local scope.

14. The computer storage media of claim 13 further comprising instructions to perform the actions of:
    storing indications of changes made to the conceptual model in a change log and wherein determining a change to a conceptual model comprises reading an indication of the change from the change log.

15. The computer storage media of claim 13 further comprising instructions to perform the actions of:
    creating a mapping relation that represents the mappings between types of the conceptual model and elements of the store model.

16. The computer storage media of claim 13 wherein determine the local scope comprises:
- assigning a pair (0,0) to a type of the hierarchy and all of the type's siblings;
- for each type with an assigned pair (m, n), if the type's parent is not assigned a pair, assigning a pair (m+2, n) to the parent;
- for each type with an assigned pair (m, n), assigning a pair (m+1, n) to any siblings of the type that have no assigned pair;
- for each type that has no pair and whose parent has a pair (m, n), assigning a pair (m, n+1);
- for each type in the hierarchy, computing a priority score using the type's pair (m, n) using a formula of $1+m-2^{(-n)}$; and
- selecting types for the local scope based on the priority scores of the types.

\* \* \* \* \*